G. L. STEWART.
CONNECTION FOR ELECTRIC CONDUITS.
APPLICATION FILED JULY 2, 1912.
1,226,921.
Patented May 22, 1917.
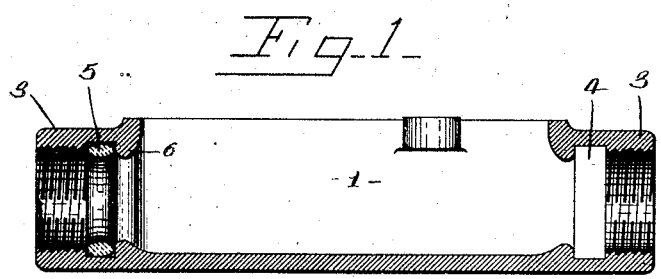
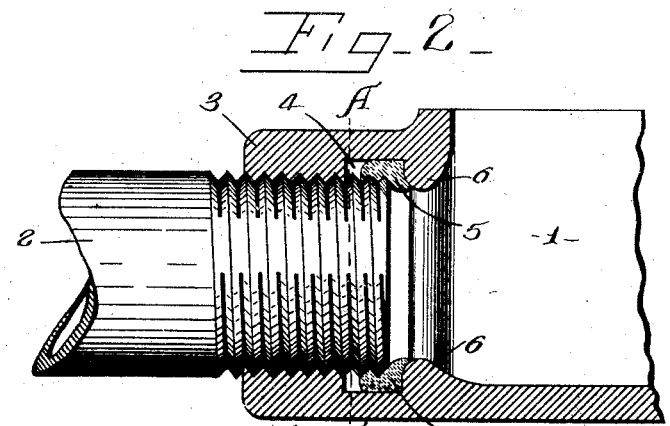
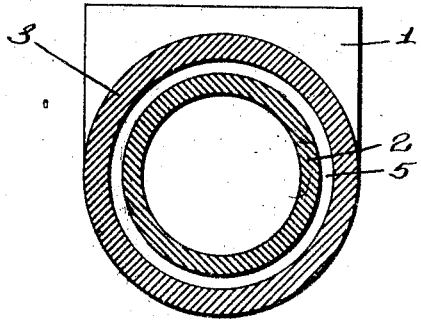
WITNESSES:
INVENTOR.
George L. Stewart
BY
Parsons Hall Bodell
ATTORNEYS

UNITED STATES PATENT OFFICE.

GEORGE L. STEWART, OF SYRACUSE, NEW YORK, ASSIGNOR TO CROUSE-HINDS COMPANY, OF SYRACUSE, NEW YORK, A CORPORATION OF NEW YORK.

CONNECTION FOR ELECTRIC CONDUITS.

1,226,921.        Specification of Letters Patent.        Patented May 22, 1917.

Application filed July 2, 1912. Serial No. 707,159.

*To all whom it may concern:*

Be it known that I, GEORGE L. STEWART, of Syracuse, in the county of Onondaga and State of New York, have invented a certain new and useful Connection for Electric Conduits, of which the following is a specification.

This invention has for its object the production of a connection for conduits especially electrical conduits, in which it is particularly necessary to guard against the entrance of moisture into the conduits at the joints, and it consists in the features of construction hereinafter set forth and claimed.

In describing this invention reference is had to the accompanying drawing in which like characters designate corresponding parts in all the views.

Figure 1 is a longitudinal sectional view of a conduit outlet box used in electrical construction, the box being provided with my invention.

Fig. 2 is an enlarged fragmentary view of one end of such box with the electrical conduit turned therein against the gasket.

Fig. 3 is a sectional view on line "A—A", Fig. 2.

1 is a conduit member, as an outlet box for electric wires to which box a second member as a pipe or conduit 2 is connected, the box being formed with a threaded connection as an internally threaded nipple 3 for receiving the threaded end of the conduit member 2, said nipple 3 having an annular recess 4 at the inner end of its threaded passage, and the recess being preferably rectangular in cross section. The member 1 is also provided with an annular shoulder or the abutment 6 at the inner side of each recess and at the extreme inner end of each nipple 3, this abutment or shoulder being of less diameter than the threaded passage of the nipple 3 and located in position to be opposed to the end edge face of the pipe threading in the passage 3.

5 is an element forming part of the joint between the members 1, 2, said element being a gasket located in the recess 4 and formed of yielding material as rubber, the gasket being of a different form in cross section from that of the recess 4 and having an internally inclined face presented toward the passage of the nipple 3 in order to be engaged by the advance end of the pipe 2, as the same is being turned in the nipple, and forced or compressed by the end edge face of the pipe against the shoulder 6 and also outwardly by such pipe as the pipe advances so that said gasket will conform to the periphery of the pipe and to the contour of the recess 4. The compressing of the gasket toward the shoulder 6 and the cutting into the inner inclined face of the gasket, causes the gasket to be distorted outwardly or in a direction opposite to that in which the force is applied by the pipe moving into the threaded passage. Hence, the gasket is caused to tightly and snugly engage the walls of the recess and the threads of the pipe.

The yielding action of the gasket takes place without tearing, owing to the inclined face and to the different cross sectional forms of the recess 4 and gasket 5.

As here shown the gasket is rounding in cross section and the internal diameter thereof is less than the exterior diameter of the pipe 2, so that the advance end of the pipe engages the curved internal face of the gasket as such pipe advances. More specifically the gasket is elliptical in cross section and the longest diameter of the ellipse being arranged parallel to the axis of the gasket.

In operation, as the pipe 2 is turned into the nipple 3, it engages the opposing inner elliptically curved or inclined face of the gasket and forces the gasket, without tearing the same, into a position such as that shown in Fig. 2.

What I claim is:

1. In a connection for conduits, the combination of two conduit members, one being formed with a threaded passage and an enlarged recess at the inner end of said passage and also with a shoulder at the inner end of the recess, the shoulder being of less diameter than the threaded passage, and the other member being a pipe threading in the passage, and a gasket of yielding material in the form of a ring arranged in the recess and being of different cross sectional form from that of the recess, the internal diameter of said ring being less than the diameter of the threaded passage, the ring having an internal, inclined annular face arranged to be engaged by the advance threaded end of the pipe and by the annular end face of the pipe, whereby the gasket is forced against said shoulder and distorted, to conform to the recess, substantially as and for the purpose described.

2. In a connection for conduits, the combination of two conduit members, one being formed with a threaded passage and an enlarged annular recess at the inner end of said passage and also with an annular abutment at the inner side of the recesses, the abutment being of less diameter than that of the threaded passage, and the other member being a pipe threading in said passage, and a gasket of yielding material in the form of a ring arranged partly in the recess and having its inner diameter less than the diameter of the threaded passage, the ring being rounding in cross section and having its inner diameter less than the diameter of the passage and also having a receding inner inclined annular face arranged to be engaged by the threaded end of the pipe and also by the annular edge face of the pipe whereby the advance threaded end of the pipe engages the inclined internal face of the ring as said pipe is being turned in the passage and the annular end edge face of the pipe forces the gasket against said abutment so that the gasket is distorted to conform to the recess, and said recess being of different cross sectional form from the gasket, substantially as and for the purpose specified.

3. In a connection for electric conduits, the combination of two conduit members, one being formed with a threaded passage, and an enlarged annular recess at the inner end of said passage, the recess being substantially rectangular in cross section and the other member being a pipe threading in such passage, and a gasket of yielding material in the form of a ring arranged in the recess, the ring being elliptical in cross section and arranged with the longer diameter of the ellipse parallel to the axis of the gasket and the internal diameter of the gasket being less than the external diameter of the pipe whereby the advance end of the pipe engages the curved internal face of the gasket as such pipe is being turned into the passage and thereby causes the gasket to conform without tearing to the contour of the recess and the threaded periphery of the pipe, substantially as and for the purpose set forth.

In testimony whereof, I have hereunto signed my name in the presence of two attesting witnesses, at Syracuse, in the county of Onondaga, and State of New York, this 14th day of June, 1912.

GEORGE L. STEWART.

Witnesses:
C. C. SCHOENECK,
WM. CORNELL BLANDING.